(12) United States Patent
Paller et al.

(10) Patent No.: US 9,593,856 B2
(45) Date of Patent: Mar. 14, 2017

(54) OVEN APPLIANCE WITH DIRECTED VENT OPENINGS

(71) Applicant: General Electric Company, Schenectady, NY (US)

(72) Inventors: Hans Juergen Paller, Louisville, KY (US); Justin Patrick Todd, Louisville, KY (US)

(73) Assignee: Haier U.S. Appliance Solutions, Inc., Wilmington, DE (US)

( * ) Notice: Subject to any disclaimer, the term of this patent is extended or adjusted under 35 U.S.C. 154(b) by 568 days.

(21) Appl. No.: 14/147,626

(22) Filed: Jan. 6, 2014

(65) Prior Publication Data

US 2015/0192307 A1 Jul. 9, 2015

(51) Int. Cl.
*F24C 15/32* (2006.01)
*A21B 1/24* (2006.01)
*F24C 3/08* (2006.01)

(52) U.S. Cl.
CPC .......... *F24C 15/322* (2013.01); *A21B 1/245* (2013.01); *F24C 3/087* (2013.01)

(58) Field of Classification Search
CPC .......... F24C 3/008; F24C 3/027; F24C 3/085; F24C 3/087; F24C 7/067; F24C 7/046; A47J 37/01; A47J 37/015; A47J 39/003; A21B 1/245; A21B 1/26

USPC ..................................................... 126/273 R
See application file for complete search history.

(56) References Cited

U.S. PATENT DOCUMENTS

| 979,413 | A | | 12/1910 | Best | |
|---|---|---|---|---|---|
| 3,364,912 | A | * | 1/1968 | Dills | F24C 14/025 126/21 A |
| 4,430,989 | A | * | 2/1984 | Narang | F24C 3/008 126/21 A |
| 5,451,744 | A | * | 9/1995 | Koopman | F24C 15/322 219/400 |
| 5,816,234 | A | * | 10/1998 | Vasan | F24C 15/322 126/21 A |
| 2011/0132350 | A1 | * | 6/2011 | Ryu | F24C 15/322 126/39 E |
| 2012/0037142 | A1 | * | 2/2012 | Chilton | F24C 3/008 126/21 R |
| 2015/0101592 | A1 | * | 4/2015 | Cadima | F24C 15/18 126/41 R |

* cited by examiner

*Primary Examiner* — David J Laux
(74) *Attorney, Agent, or Firm* — Dority & Manning, P.A.

(57) ABSTRACT

An oven appliance with one or more vents in the bottom wall of the cooking chamber is provided. One or more features are provided for directing the flow of heated air from the vents towards the center of the cooking chamber. In certain embodiments, one or more slots or openings provide heated air that is directed towards the front or door of the cooking chamber of the appliance.

20 Claims, 6 Drawing Sheets

US 9,593,856 B2

OVEN APPLIANCE WITH DIRECTED VENT OPENINGS

FIELD OF THE INVENTION

The subject matter of the present disclosure relates generally to an oven appliance with vent openings that direct flow towards the center of the cooking chamber.

BACKGROUND OF THE INVENTION

Oven appliances generally include a cabinet that defines a cooking chamber for baking or broiling food items therein. Oven appliances also generally include a self-cleaning feature for cleaning the cooking chamber. To heat the cooking chamber for baking or for self-cleaning, gas oven appliances include one or more gas burners positioned at a bottom portion of the cooking chamber and may be beneath the floor of the cooking chamber.

When positioned beneath the floor of the cooking chamber, openings can be provided on the sides of the floor to allow heated air to pass from beneath the floor into the cooking chamber. Typically, this heated air travels vertically upward along the sides of the cooking chamber, by-passing food near the center of the cooking chamber, and reaching the top of the cooking chamber. From here, the heated air may then travel towards the center of the oven where the heated air from both sides of the cooking chamber can meet. The resulting turbulence may direct some heated air towards food positioned on racks in the oven center.

Thus, with this conventional construction, air heated by the gas burner (or other heating element) is directed toward the sides of the cooking chamber, without directing heated air toward, e.g., the center of the cooking chamber. This can result in the cooking chamber having areas of cooler temperatures, which can negatively affect baking and self-clean performance. In addition, because heated air is also typically not directed towards the front or door of the cooking chamber, this can also result in an area of cooler temperature as the door may not be as well insulated as the walls of the cooking chamber and heat is lost when the door is opened.

Accordingly, an oven appliance with features for directing the flow of heated air would be useful. In particular, an oven appliance with features for directing the flow of heated air from beneath the floor of the cooking chamber towards the center of the cooking chamber would be advantageous. Further, an oven appliance having a slot that directs a flow of heated air across the front portion of the cabinet would also be useful.

BRIEF DESCRIPTION OF THE INVENTION

The present invention provides an oven appliance with one or more vents in the bottom wall of the cooking chamber. One or more features are provided for directing the flow of heated air from the vents towards the center of the cooking chamber. In certain embodiments, one or more slots or openings provide heated air that is directed towards the front or door of the cooking chamber of the appliance. Additional aspects and advantages of the invention will be set forth in part in the following description, may be apparent from the description, or may be learned through practice of the invention.

In a first exemplary embodiment, an oven appliance includes a cabinet that defines an opening at a front portion of the cabinet and defines a cooking chamber configured for the receipt of food items for cooking. The cooking chamber includes a top wall, a bottom wall, a back wall, and opposing side walls. A door is mounted to the cabinet at the opening of the cabinet. The door is selectively adjustable between an open position and a closed position to permit selective access to the cooking chamber through the opening of the cabinet. A heating element is disposed adjacent and below the bottom wall of the cooking chamber and is configured to heat the cooking chamber. The bottom wall of the cooking chamber includes a plurality of vents; at least one vent is adjacent each of the opposing side walls and at least one vent is adjacent the front portion of the cabinet. The oven appliance also includes a plurality of flow directors. At least one flow director is positioned adjacent each vent, and each flow director is configured to direct a flow of heated air passing through a respective vent from beneath the bottom wall toward a center of the cooking chamber.

In a second exemplary embodiment, an oven appliance includes a cabinet that defines an opening at a front portion of the cabinet and defines a cooking chamber configured for the receipt of food items for cooking. The cooking chamber includes a top wall, a bottom wall, a back wall, and opposing side walls. A door is mounted to the cabinet at the opening of the cabinet. The door is selectively adjustable between an open position and a closed position to permit selective access to the cooking chamber through the opening of the cabinet. A heating element is disposed adjacent and below the bottom wall of the cooking chamber and is configured to heat the cooking chamber. The bottom wall of the cooking chamber includes a slot adjacent the opening of the cabinet and a plurality of vents. At least one vent is adjacent each of the opposing side walls, and the slot and vents allow heated air from beneath the bottom wall to flow into the cooking chamber. The oven appliance also includes a plurality of flow directors. At least one flow director is positioned adjacent each vent, and each flow director is configured to direct a flow of heated air from beneath the bottom wall toward a center of the cooking chamber.

In a third exemplary embodiment, an oven appliance includes a cabinet that defines an opening at a front portion of the cabinet and defines a cooking chamber configured for the receipt of food items for cooking. The cooking chamber includes a top wall, a bottom wall, a back wall, and opposing side walls. A door is mounted to the cabinet at the opening of the cabinet. The door is selectively adjustable between an open position and a closed position to permit selective access to the cooking chamber through the opening of the cabinet. A heating element is disposed adjacent and below the bottom wall of the cooking chamber and is configured to heat the cooking chamber. The bottom wall of the cooking chamber includes a slot adjacent the opening of the cabinet and a plurality of vents; at least one vent is adjacent each of the opposing side walls, and at least one vent is adjacent the front portion of the cabinet. The slot and vents allow heated air from beneath the bottom wall to flow into the cooking chamber. The oven appliance also includes a plurality of flow directors. At least one flow director is positioned adjacent each vent, and each flow director is configured to direct a flow of heated air from beneath the bottom wall toward a center of the cooking chamber.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Use of the same reference numerals in different figures denotes the same or similar features.

DETAILED DESCRIPTION OF THE INVENTION

Figure 1:
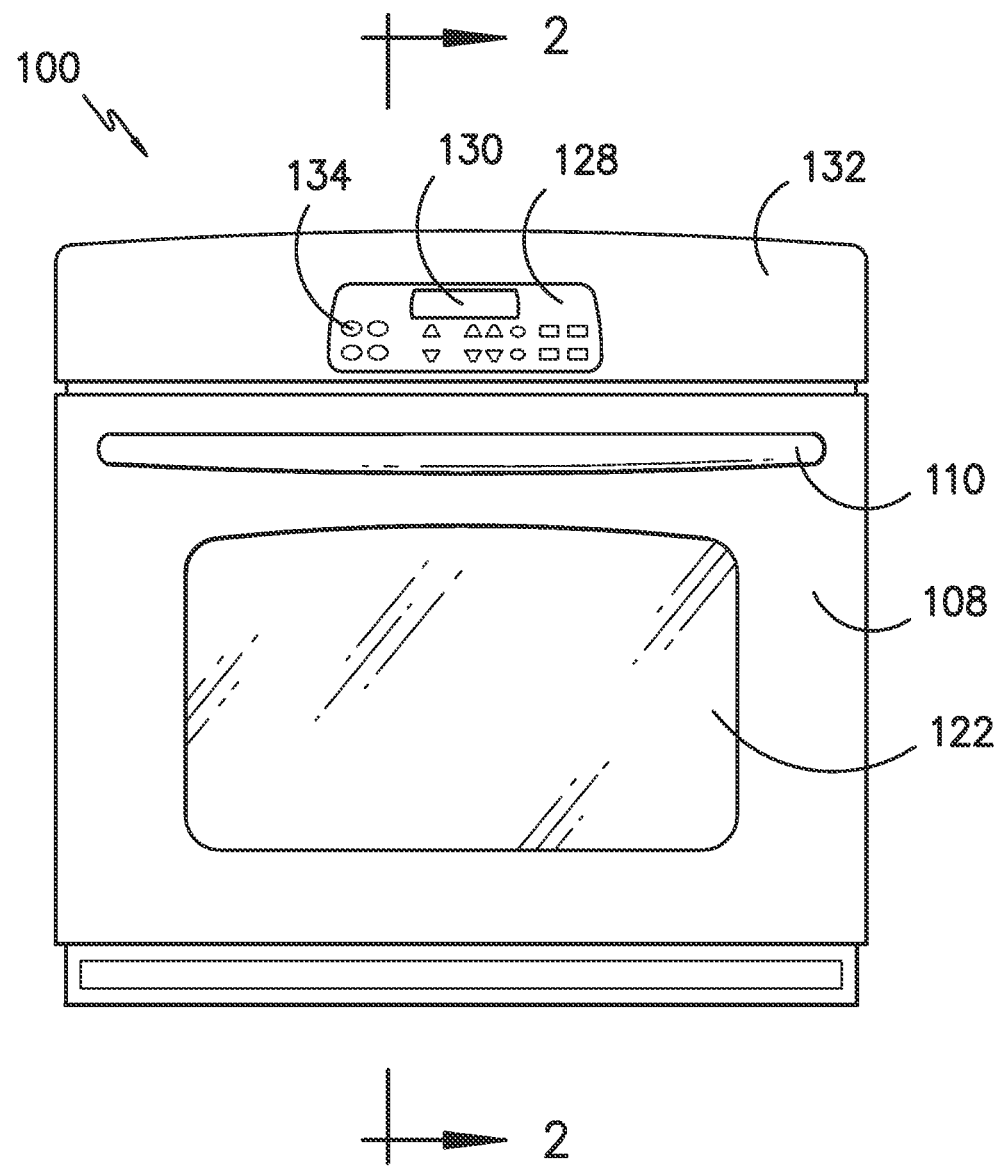
FIG. 1 provides a front view of an exemplary embodiment of an oven appliance of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
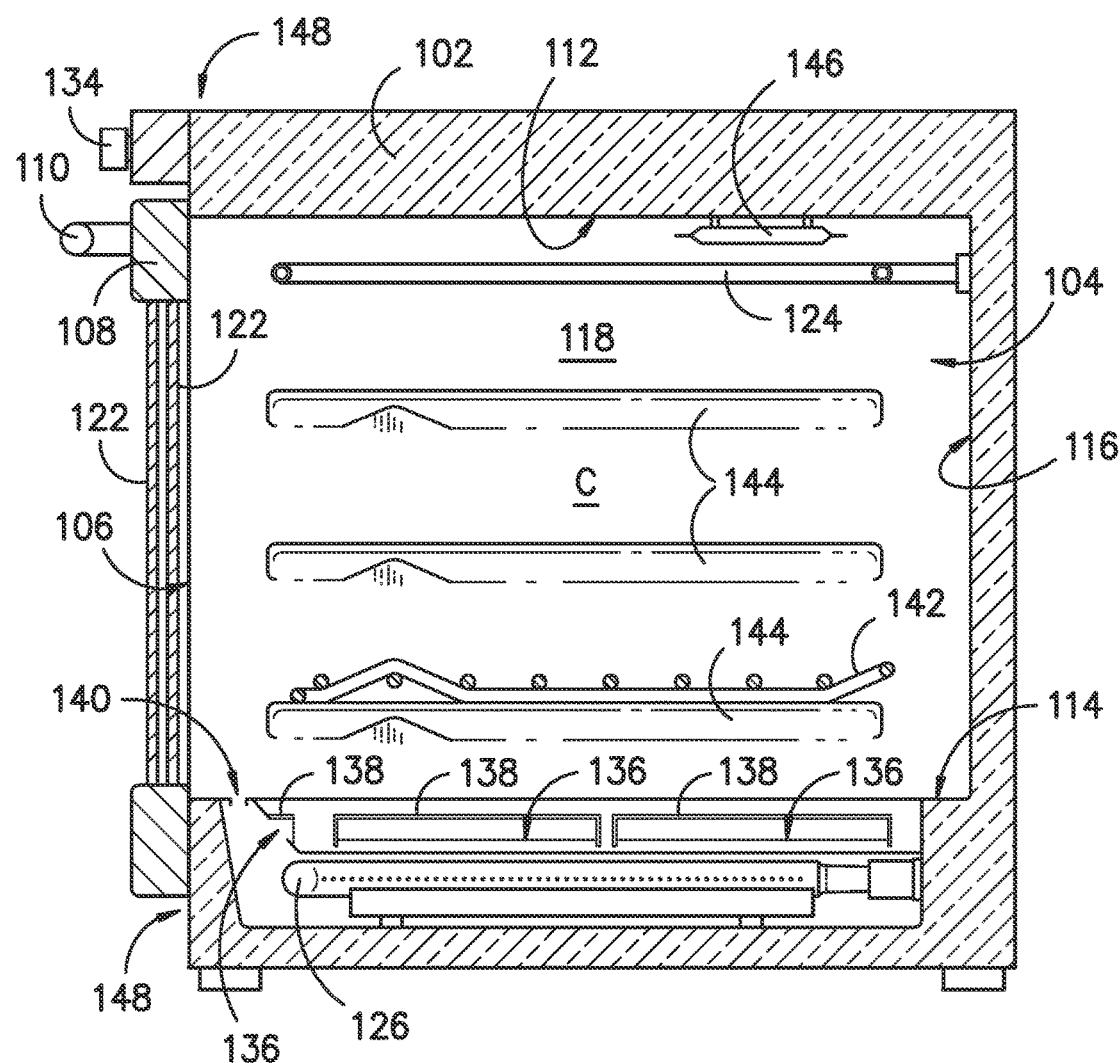
FIG. 2 is a cross-sectional view of the oven appliance of FIG. 1 taken along the 2-2 line of FIG. 1.
Figure 3:
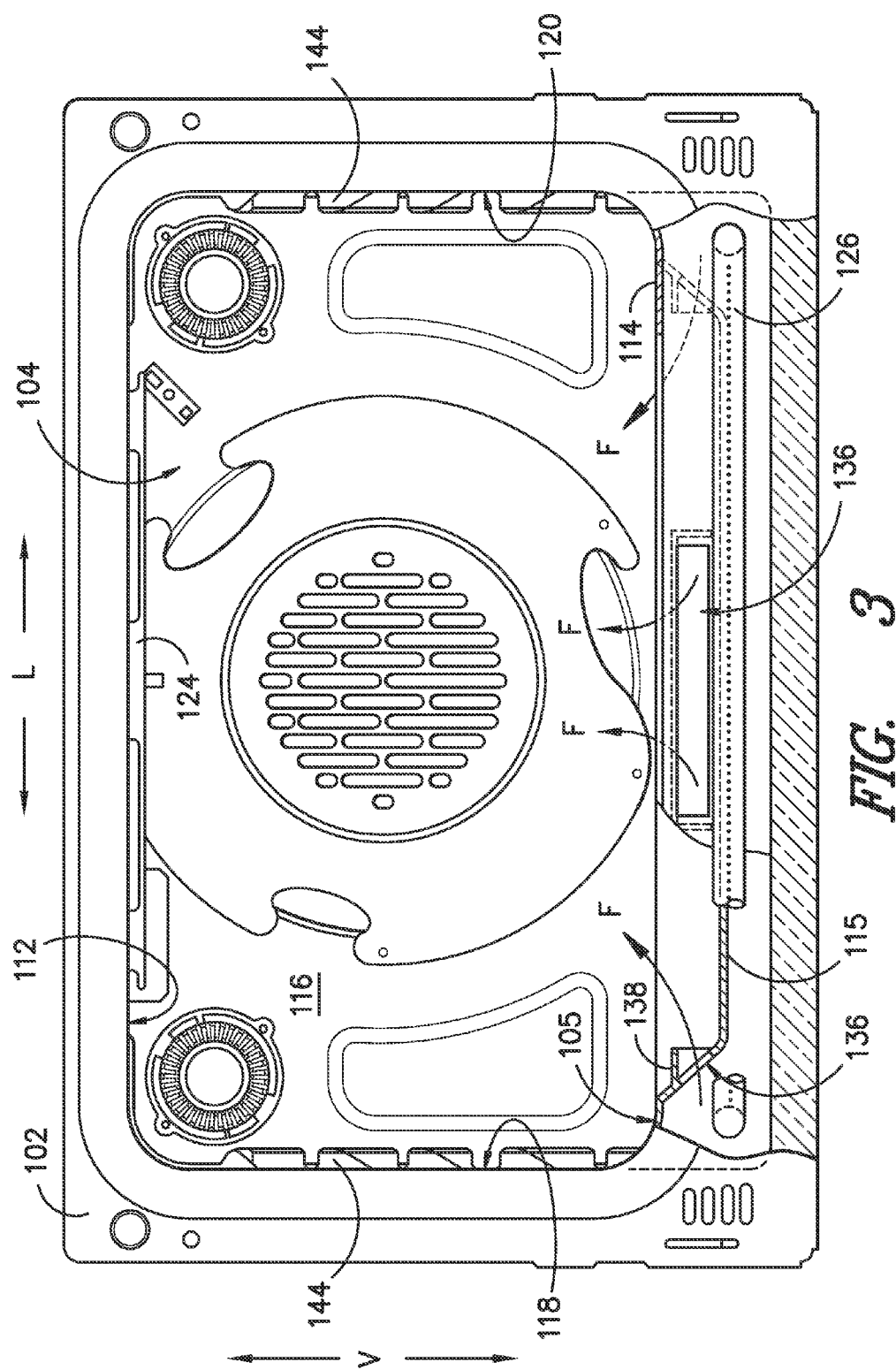
FIG. 3 is a front view of the cabinet and cooking chamber of the exemplary oven appliance of FIG. 1.
Figure 4:
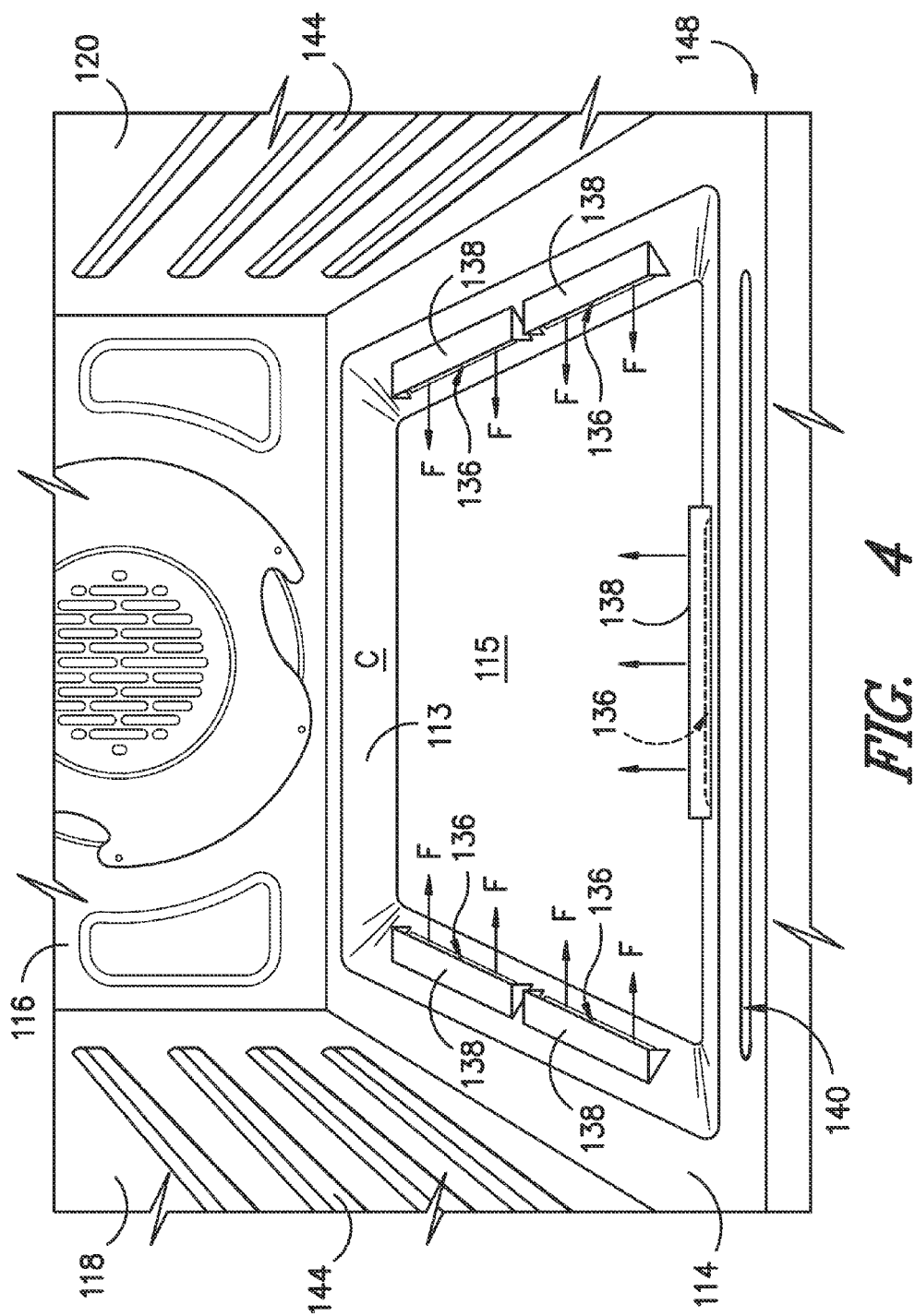
FIG. 4 is a perspective view of the bottom of the cooking chamber of FIG. 3.

Referring to FIGS. 1 and 2, for this exemplary embodiment, oven appliance 100 includes an insulated cabinet 102 with an interior cooking chamber 104 defined by a top wall 112, a bottom wall 114, a back wall 116, and opposing side walls 118, 120. Cooking chamber 104 is configured for the receipt of one or more food items to be cooked. Oven appliance 100 includes a door 108 rotatably mounted, e.g., with one or more hinges (not shown), to cabinet 102 at the opening 106 of cabinet 102 to permit selective access to cooking chamber 104 through opening 106. A handle 110 is mounted to door 108 and assists a user with opening and closing door 108. For example, a user can pull on handle 110 to open or close door 108 and access cooking chamber 104.

Oven appliance 100 can include a seal (not shown) between door 108 and cabinet 102 that assists with maintaining heat and cooking fumes within cooking chamber 104 when door 108 is closed as shown in FIGS. 1 and 2. Multiple parallel glass panes 122 provide for viewing the contents of cooking chamber 104 when door 108 is closed and assist with insulating cooking chamber 104. A baking rack 142 is positioned in cooking chamber 104 for the receipt of food items or utensils containing food items. Baking rack 142 is slidably received onto embossed ribs or sliding rails 144 such that rack 142 may be conveniently moved into and out of cooking chamber 104 when door 108 is open.

A heating element at the top, bottom, or both of cooking chamber 104 provides heat to cooking chamber 104 for cooking. Such heating element(s) can be gas, electric, microwave, or a combination thereof. For example, in the embodiment shown in FIG. 2, oven appliance 100 includes a top heating element 124 and a bottom heating element 126, where bottom heating element 126 is a U-shaped gas burner positioned adjacent to and below bottom wall 114.

Oven appliance 100 includes a user interface 128 having a display 130 positioned on an interface panel 132 and having a variety of controls 134. Interface 128 allows the user to select various options for the operation of oven 100 including, e.g., temperature, time, and/or various cooking and cleaning cycles. Operation of oven appliance 100 can be regulated by a controller (not shown) that is operatively coupled, i.e., in communication with, user interface 128, heating elements 124, 126, and other components of oven 100 as will be further described.

For example, in response to user manipulation of the user interface 128, the controller can operate the heating element(s). The controller can receive measurements from a temperature sensor 146 placed in cooking chamber 104 and, e.g., provide a temperature indication to the user with display 130. The controller can also be provided with other features as will be further described herein.

By way of example, the controller may include a memory and one or more processing devices such as microprocessors, CPUs, or the like, such as general or special purpose microprocessors operable to execute programming instructions or micro-control code associated with operation of oven appliance 100. The memory may represent random access memory such as DRAM or read only memory such as ROM or FLASH. In one embodiment, the processor executes programming instructions stored in memory. The memory may be a separate component from the processor or may be included onboard within the processor.

The controller may be positioned in a variety of locations throughout oven appliance 100. In the illustrated embodiment, the controller may be located under or next to the user interface 128 otherwise within interface panel 132. In such an embodiment, input/output ("I/O") signals are routed between the controller and various operational components of oven appliance 100 such as heating elements 124, 126, controls 134, display 130, sensor 146, alarms, and/or other components as may be provided. In one embodiment, the user interface 128 may represent a general purpose I/O ("GPIO") device or functional block.

Although shown with touch type controls 134, it should be understood that controls 134 and the configuration of oven appliance 100 shown in FIG. 1 is provided by way of example only. More specifically, user interface 128 may include various input components, such as one or more of a variety of electrical, mechanical, or electro-mechanical input devices including rotary dials, push buttons, and touch pads. The user interface 128 may include other display components, such as a digital or analog display device designed to provide operational feedback to a user. The user interface 128 may be in communication with the controller via one or more signal lines or shared communication busses.

Also, oven 100 is shown as a wall oven, but the present invention could also be used with other cooking appliances such as, e.g., a stand-alone oven, an oven with a stove-top, or other configurations of such ovens.

Referring now to FIGS. 2, 3, 4, and 5, an exemplary embodiment of oven appliance 100 is shown with a recessed or depressed bottom wall 114 of cooking chamber 104, including angled sides 113 of bottom wall 114 and recessed or depressed portion 115 of bottom wall 114. For this exemplary embodiment, vents 136 are positioned adjacent to each of the opposing side walls 118, 120 of cooking chamber 104 and adjacent to a front portion 148 of cabinet 102. Each vent 136 allows air heated by bottom heating element 126 to flow from beneath bottom wall 114 into cooking chamber 104. Each vent 136 may be configured as one or more slots or openings in the bottom wall 114 of cooking chamber 104. Additionally, although two vents 136 are shown along each of sidewalls 118, 120, one, three, or more vents may be used along each sidewall 118, 120 or adjacent to front portion 148 of cabinet 102.

A flow director 138 is positioned adjacent to each vent 136. For this exemplary embodiment, the top panel 152 of each flow director 138 is also at a vertical position below the bottom edge 105 of opening 106 to cabinet 102. In other embodiments of the invention, the top panel 152 of one or more flow directors 138 may be at or above bottom edge 105 of opening 106. As shown by arrows F in FIGS. 3 and 4, each flow director 138 directs the flow of heated air passing through vents 136 from beneath bottom wall 114 toward the center of cooking chamber 104. Directing the flow of heated air toward the center of cooking chamber 104 minimizes areas of cooler temperatures within cooking chamber 104.

Figure 5:
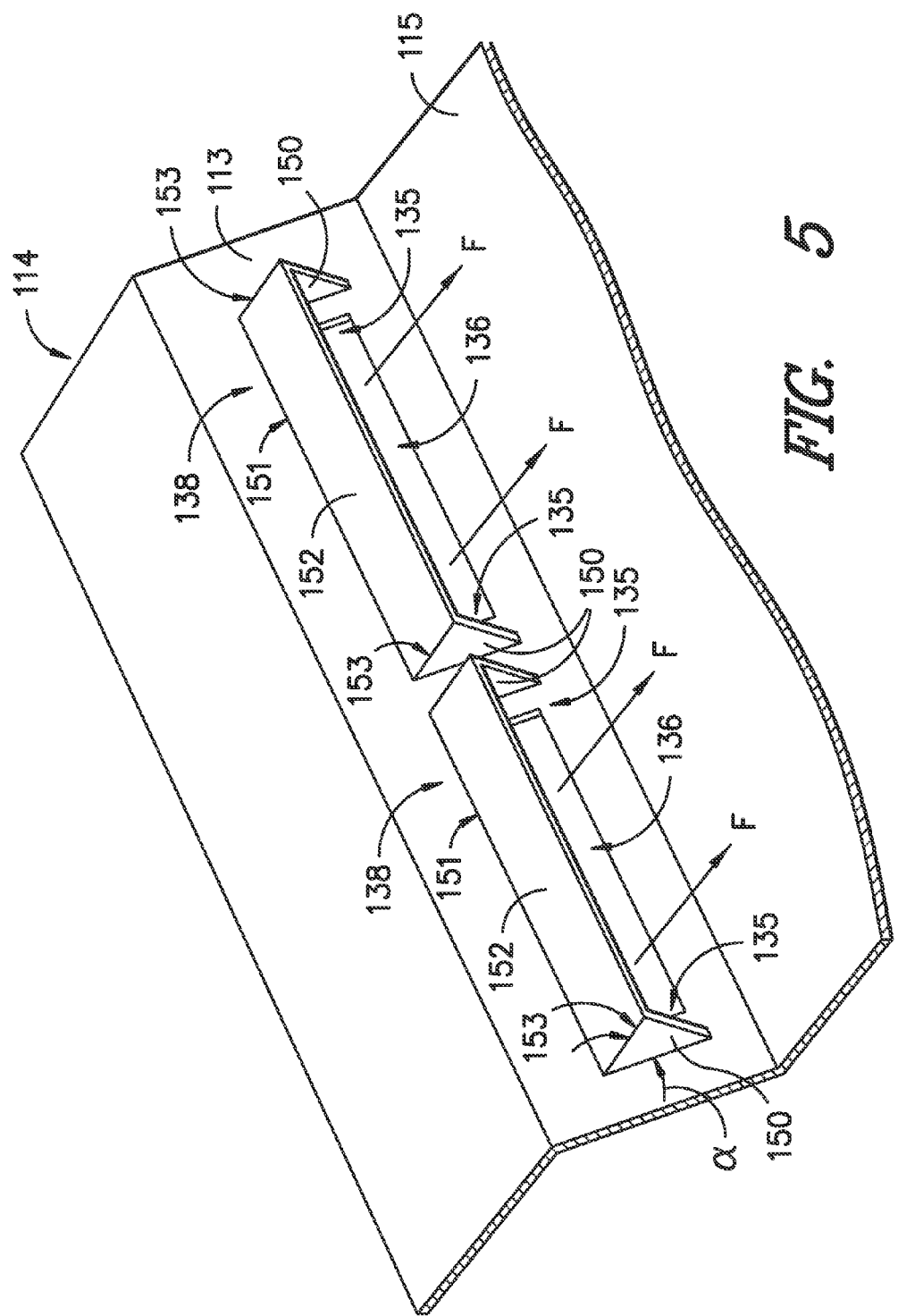
FIG. 5 is a perspective view of exemplary embodiments of flow directors of the present invention.

As illustrated in FIG. 5, for this embodiment each flow director 138 is configured with a pair of opposing side panels 150 that are substantially orthogonal to bottom wall 114 and a top panel 152 extending between side panels 150. Side panels 150 are positioned adjacent to ends 135 of vent 136. Top panel 152 is connected along longitudinal side 151 to bottom wall 114 and along opposing lateral sides 153 to side panels 150. The flow directors 138 may be formed integrally with bottom wall 114. Alternatively, flow directors 138 may be connected, fixed, or coupled to bottom wall 114 using appropriate fasteners, e.g., screws or the like, or using any suitable mechanism, e.g., snap fit mechanisms, interference fit mechanisms, or combinations thereof. The top panel 152 of each flow director 138 is positioned at an angle α relative to the angled sides 113 of bottom wall 114 near each vent 136 so as to redirect the flow of air from each vent 136. More particularly, each flow director 138 prevents heated air exiting vent 136 from flowing in a vertical direction along side walls 118, 120. Instead, flow directors 138 cause such heated air to flow generally towards the center C of cooking chamber 104. In one exemplary embodiment, angle α is in a range of about 30 to about 60 degrees. In still another embodiment, angle α is about 45 degrees. Other values for angle α may be used as well. Further, although a flow director 138 is shown at each vent 136, in other embodiments of the invention only a portion of vents 136 may be provided with flow directors 138.

Referring back to FIGS. 2 and 4, bottom wall 114 of cooking chamber 104 may also include a slot 140 positioned adjacent to the opening 106 of cabinet 102. Slot 140 allows air heated by bottom heating element 126 to flow from beneath bottom wall 114 into cooking chamber 104 at the front portion 148 of cabinet 102. Allowing heated air to flow across the front portion 148 of cabinet 102 minimizes areas of cooler temperatures in cooking chamber 104 resulting from, e.g., heat losses through door 108. Slot 140 is shown as a single slot. However, one or more slots may be used at front portion 148 as well.

Figure 6:
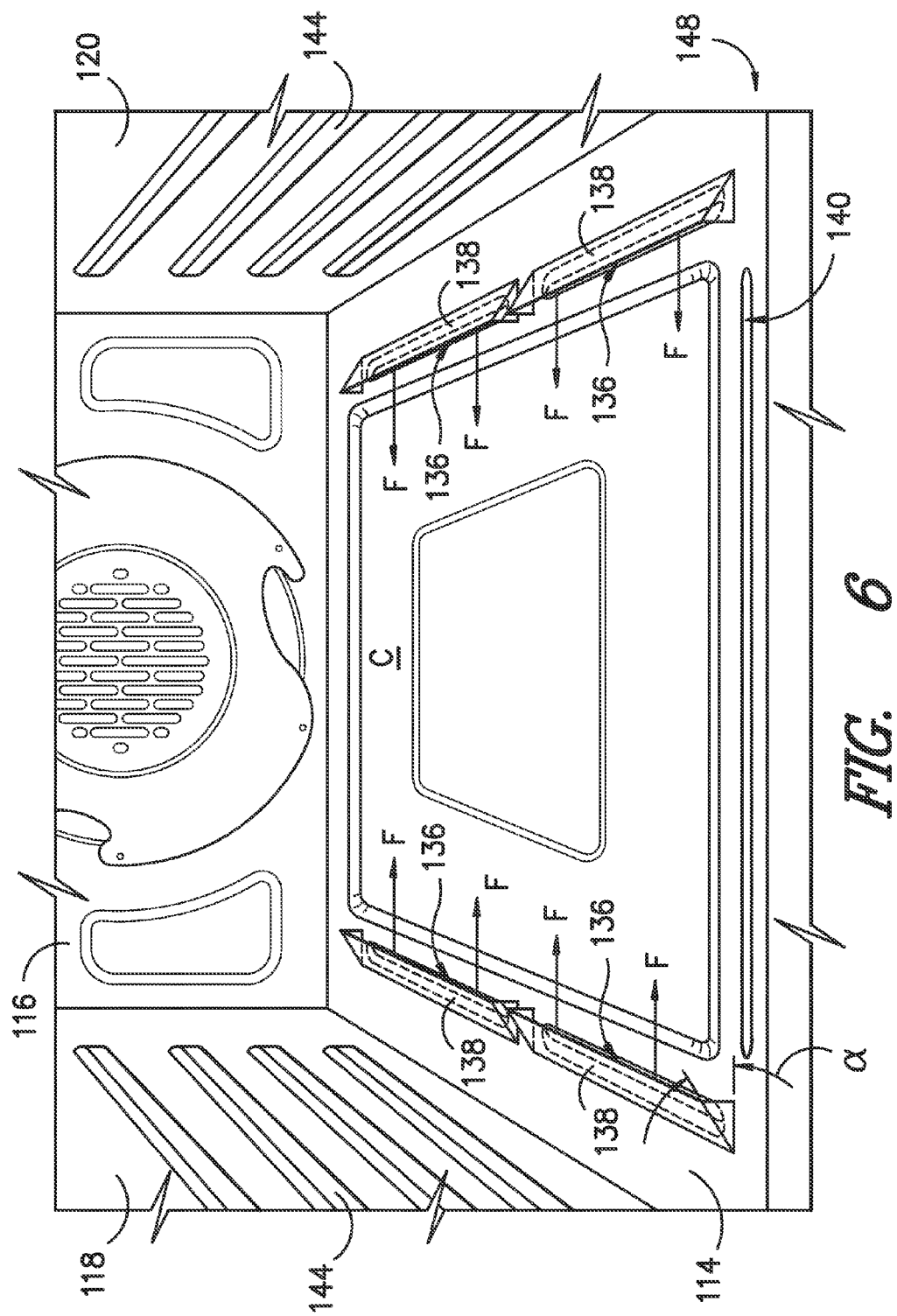
FIG. 6 is a perspective view of an alternative embodiment of the bottom of the cooking chamber of FIG. 3.

Referring now to FIG. 6, which uses the same reference numerals to denote the same or similar features, an alternative embodiment of oven appliance 100 is shown. For this exemplary embodiment, bottom wall 114 of cooking chamber 104 is substantially flat. Vents 136 are positioned adjacent to each of the opposing side walls 118, 120 of cooking chamber 104, and a flow director 138 is positioned adjacent to each vent 136. The top panel 152 of each flow director 138 is positioned at an angle α relative to the bottom wall 114 near each vent 136 so as to redirect the flow of air from each vent 136 toward the center C of cooking chamber 104. In this exemplary embodiment, the top panel 152 of each flow director 138 is above the bottom edge 105 of opening 106 of cabinet 102, but in other embodiments of the invention, top panel 152 of one or more flow directors may be at a vertical position that is at or below bottom edge 105 of opening 106.

Further, bottom wall 114 also includes slot 140, which directs the flow of heated air across the front portion 148 of cabinet 102. Although bottom wall 114 is shown with one slot 140, one or more slots may be used as well. Moreover, although two vents 136 are shown adjacent each side wall 118, 120, and no vent is shown adjacent the front portion 148 of cabinet 102, in other embodiments of the invention, one or more vents 136 may be located adjacent the opposing side walls 118, 120 and front portion 148. In addition, while a flow director 138 is shown at each vent 136, in still other embodiments of the invention, only a portion of vents 136 may be provided with flow directors 138.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An oven appliance, comprising:
   a cabinet defining an opening at a front portion of the cabinet, the cabinet also defining a cooking chamber configured for receipt of food items for cooking, the cooking chamber comprising a top wall, a bottom wall, a back wall, and opposing side walls;
   a door mounted to the cabinet at the opening of the cabinet, the door being selectively adjustable between an open position and a closed position to permit selective access to the cooking chamber through the opening of the cabinet;
   a heating element disposed adjacent and below the bottom wall of the cooking chamber and configured to heat the cooking chamber;
   wherein the bottom wall of the cooking chamber defines a raised portion and a recessed portion connected by angled sides, and wherein the bottom wall includes a plurality of vents, wherein at least one vent is adjacent each of the opposing side walls and at least one vent is adjacent the front portion of the cabinet, and wherein at least one vent is positioned on one of the angled sides of the bottom wall; and
   a plurality of flow directors, wherein at least one flow director is positioned adjacent each vent and each flow director is configured to direct a flow of heated air passing through a respective vent from beneath the bottom wall toward a center of the cooking chamber.

2. An oven appliance as in claim 1, wherein each of said flow directors comprises
   opposing side panels that are substantially orthogonal to the bottom wall; and a top panel extending between the opposing side panels, the opposing side panels and the top panel defining an opening for the flow of heated air flowing from beneath the bottom wall.

3. An oven appliance as in claim 1, wherein each of said flow directors is formed integrally with the bottom wall.

4. An oven appliance as in claim 1, wherein each of said flow directors is attached to the bottom wall.

5. An oven appliance as in claim 1, wherein said heating element comprises a U-shaped gas burner.

6. An oven appliance as in claim 1, wherein said bottom wall is positioned such that the flow directors are located lower than the opening of the cabinet along a vertical direction.

7. An oven appliance as in claim 1, said bottom wall further comprising a slot adjacent the opening of the cabinet, said slot extending along a lateral direction substantially along a width defined between the vents that are adjacent each of the opposing side walls, the slot being configured for directing heated air flowing from beneath the bottom wall across the front portion of the cabinet.

8. An oven appliance, comprising:
a cabinet defining an opening at a front portion of the cabinet, the cabinet also defining a cooking chamber configured for receipt of food items for cooking, the cooking chamber comprising a top wall, a bottom wall, a back wall, and opposing side walls;
a door mounted to the cabinet at the opening of the cabinet, the door being selectively adjustable between an open position and a closed position to permit selective access to the cooking chamber through the opening of the cabinet;
a heating element disposed adjacent and below the bottom wall of the cooking chamber and configured to heat the cooking chamber;
wherein the bottom wall of the cooking chamber comprises a slot adjacent said opening of the cabinet and a plurality of vents, wherein at least one vent is adjacent each of the opposing side walls, and wherein the slot extends along a lateral direction substantially along a width defined between the vents that are adjacent each of the opposing side walls, and wherein the slot and vents allow heated air from beneath the bottom wall to flow into the cooking chamber; and
a plurality of flow directors, wherein at least one flow director is positioned adjacent each vent and each flow director is configured to direct the flow of heated air from beneath the bottom wall toward a center of the cooking chamber.

9. An oven appliance as in claim 8, wherein each of said flow directors comprises
opposing side panels that are substantially orthogonal to the bottom wall; and
a top panel extending between the opposing side panels;
wherein the opposing side panels and the top panel defines an opening for the flow of heated air from beneath the bottom wall.

10. An oven appliance as in claim 8, wherein each of said flow directors is formed integrally with the bottom wall.

11. An oven appliance as in claim 8, wherein each of said flow directors is attached to the bottom wall.

12. An oven appliance as in claim 8, wherein said heating element comprises a U-shaped gas burner.

13. An oven appliance as in claim 8, wherein at least one of said vents is adjacent the front portion of the cabinet.

14. An oven appliance as in claim 8, wherein said bottom wall is at a vertical position such that the flow directors are located below the opening of the cabinet.

15. An oven appliance, comprising:
a cabinet defining an opening at a front portion of the cabinet, the cabinet also defining a cooking chamber configured for receipt of food items for cooking, the cooking chamber comprising a top wall, a bottom wall, a back wall, and opposing side walls;
a door mounted to the cabinet at the opening of the cabinet, the door being selectively adjustable between an open position and a closed position to permit selective access to the cooking chamber through the opening of the cabinet;
a heating element disposed adjacent and below the bottom wall of the cooking chamber and configured to heat the cooking chamber;
wherein the bottom wall of the cooking chamber includes a slot adjacent said opening of the cabinet and a plurality of vents, wherein at least one vent is adjacent each of the opposing side walls and at least one vent is adjacent the front portion of the cabinet, and wherein the slot extends along a lateral direction substantially along a width defined between the vents that are adjacent each of the opposing side walls, and wherein the slot and vents allow heated air from beneath the bottom wall to flow into the cooking chamber; and
a plurality of flow directors, wherein at least one flow director is positioned adjacent each vent and each flow director is configured to direct the flow of heated air from beneath the bottom wall toward a center of the cooking chamber.

16. An oven appliance as in claim 15, wherein each of said flow directors comprises
opposing side panels that are substantially orthogonal to the bottom wall; and
a top panel extending between the opposing side panels;
wherein the opposing side panels and the top panel define an opening for the flow of heated air from beneath the bottom wall.

17. An oven appliance as in claim 15, wherein each of said flow directors is formed integrally with the bottom wall.

18. An oven appliance as in claim 15, wherein each of said flow directors is attached to the bottom wall.

19. An oven appliance as in claim 15, wherein said heating element comprises a U-shaped gas burner.

20. An oven appliance as in claim 15, wherein said bottom wall is positioned such that the flow directors are located below the opening of the cabinet.

* * * * *